United States Patent [19]
Ingram

[11] Patent Number: 5,340,302
[45] Date of Patent: Aug. 23, 1994

[54] APPARATUS FOR PREPARING HOLLOW PLASTIC ARTICLE

[75] Inventor: Ronald W. Ingram, Toronto, Canada

[73] Assignee: Husky Injection Molding Systems Ltd., Bolton, Canada

[21] Appl. No.: 86,656

[22] Filed: Jul. 6, 1993

[51] Int. Cl.⁵ .......................................... B29C 49/56
[52] U.S. Cl. ................................. 425/528; 425/529; 425/535; 425/541
[58] Field of Search ............... 425/528, 529, 535, 541, 425/534; 264/532, 531

[56] References Cited

U.S. PATENT DOCUMENTS

| | | | |
|---|---|---|---|
| 3,924,998 | 12/1975 | Moore | 425/535 X |
| 4,330,255 | 5/1982 | Suzuki | 425/529 |
| 4,426,202 | 1/1984 | Krishnakumar et al. | 425/534 |
| 4,432,720 | 2/1984 | Wiatt et al. | 425/541 X |
| 4,505,664 | 3/1985 | Craig | 425/535 X |
| 4,690,633 | 9/1987 | Schad et al. | 425/528 X |
| 4,818,212 | 4/1989 | Gibbemeyer | 264/532 X |
| 5,137,443 | 8/1992 | Munoz et al. | 425/541 X |

*Primary Examiner*—Richard L. Chiesa
*Attorney, Agent, or Firm*—Bachman & LaPointe

[57] ABSTRACT

Apparatus for forming hollow plastics including reciprocable mold portions to form a blow mold movable from an open position to a closed position a holding device for holding the parison within the blow mold. An alignment device is provided for aligning the parison with the blow mold.

15 Claims, 6 Drawing Sheets

APPARATUS FOR PREPARING HOLLOW PLASTIC ARTICLE

BACKGROUND OF THE INVENTION

Plastic parisons or preforms are conventionally reheated and formed into hollow plastic articles by blow molding in a blow mold using high pressure fluid, with if desired using a stretch rod for stretch blow molding.

The preforms are preheated in ovens immediately prior to being transferred into a blow mold. Stretch rods may be incorporated with the blow mold and typically enter the preforms from its open end and extend during the blow stage to cause biaxial orientation of the blown article.

A two stage reheat blowing machine of the type described in U.S. Pat. Nos. 4,793,960, 4,690,633 and 4,522,581 uses a series of pallets to carry preforms through a series of processing stages: thermal conditioning, stretch-blow molding and strip-off or ejection. At the stretch-blow molding station it is important that the preform is accurately aligned with the blow mold to insure that the finished blown article is symmetrically formed with respect to the neck finish. It is also important that the means used to seal the interior of the preform effectively prevent the escape of the high pressure, typically up to 700 psi, fluid used to blow the preform within the closed mold. Loss of the fluid reduces the effectiveness of the blowing, creates noise, and may cause the neck finish to be deformed if leakage occurs in that area.

Prior art machines for stretch blowing and using preforms mounted on traveling pallets by means of mandrels include U.S. Pat. Nos. 4,505,664, 4,426,202, 4,470,797, 4,487,568 and 4,456,447. Usually the mandrel is fitted inside the preform's neck finish with a minimum gap to reduce air leakage. The '568 and '447 patents show external latches to hold the preform on the mandrel and the '797 patent shows a spring loaded detent for the same purpose. In these cases, the preform is depending from the mandrel/holder and unless restrained would possibly fall off, given the amount of machine vibration and motion that it is subjected to.

Prior art machines simply close the blow mold halves trapping the preform's neck finish between the mold halves and the inner mandrel, thus initially achieving an air tight seal. However, the high pressure blowing fluid may cause the neck finish to separate from the mandrel and allow the fluid to leak, and also act on the inner wall of the neck finish causing it to deform. This deficiency is particularly prone to occur when large diameter preforms are being blown. Here the large projected area of the neck finish can be easily deformed when exposed to the blowing fluid. Prior art machines rely on the engagement of the mold directly with the preform to align the preform within the closed mold. In some cases, the preform may not be perfectly aligned, or may be moved off center by the action of the stretch rod acting inside the preform during stretching. Damage often occurs when the blow mold halves close onto the preform before the preform is even blown. Consequently, the blown article's body may not be aligned with its neck finish. The '664 reference forms an internal thread in the blown part and the blow nozzle must be unscrewed from the part before the mold can be opened. U.S. Pat. Nos. 4,818,212 and 4,036,573 also show typical stretch blow nozzle arrangements.

U.S. Pat. No. 5,137,443 discloses a holding device for holding the parison within the blow mold and first and second locking portions affixed to the holding device and blow mold portions, respectively, engagable with each other when the blow mold portions are in a closed position to align and clamp the holding device to the blow mold, whereby blowing force is transmitted to the engaged locking portions.

Accordingly, it is a principal object of the present invention to provide an apparatus for forming hollow plastic articles which includes a blow mold and holding means for holding a parison within the blow mold, wherein the apparatus includes means for conveniently and effectively aligning the blow mold portions.

It is a further object of the present invention to provide a versatile apparatus as aforesaid which permits the use of high pressure fluid without leakage and which permits accurate alignment reproducably over many operating cycles.

It is a still further object of the present invention to provide an apparatus as aforesaid which is suitable for use with different size parisons and which permits accurate positioning and clamping with little chance of parison damage.

Further objects and advantages of the present invention will appear hereinbelow.

SUMMARY OF THE INVENTION

In accordance with the present invention, the foregoing objects and advantages are readily obtained.

The apparatus of the present invention which forms hollow plastic articles comprises: a blow mold for forming a hollow plastic article from a parison including at least two relatively reciprocable mold portions movable from an open position to a closed position; holding means for holding the parison within the blow mold including channel means within the holding means communicating with the parison permitting the introduction of high pressure fluid into the parison to expand the parison into conformance with the blow mold, said holding means also including a mandrel supporting the parison and engagable with the parison; first alignment means to align the holding means with the blow mold, with the first alignment means generally being spaced from the mandrel means; second alignment means in fixed relationship to the blow mold and generally on the blow mold adjacent and spaced from the holding means in the mold closed position to align the parison with the mandrel and the blow mold; a blow nozzle engagable with the holding means in the mold closed position for the introduction of high pressure fluid into the parison; and wherein the second alignment means contacts the holding means and clamps the holding means to the second alignment means upon engagement of the blow nozzle with the holding means.

The holding means generally includes a spindle supporting the mandrel having a peripheral spindle surface and with the mandrel being interchangeable. It is preferred that the second alignment means contact the holding means and clamp the holding means and align the parison to the second alignment means and hence to the blow mold upon engagement of the blow nozzle with the holding means or upon the introduction of high pressure fluid.

The first alignment means preferably includes a peripheral surface facing the peripheral spindle surface in the mold closed position so that in this position a space is provided therebetween to permit sliding movement of the holding means.

The mandrel should include a sealing means facing the inside of the parison to seal the mandrel to the parison. The parison has an open end which engages a surface of the mandrel, wherein said surface is spaced from the first alignment means in the mold closed position. The parison generally has an outwardly extending flange which engages a corresponding locating and retaining flange on the second alignment means upon engagement of the blow nozzle with the holding means or upon introduction of high pressure fluid. Also, the second alignment means has a clamping surface which engages the mandrel surface upon engagement of the blow nozzle with the holding means, wherein the clamping surface is a fixed distance from the corresponding locating and retaining flange on the second alignment means.

The foregoing apparatus is highly advantageous. It represents a self-contained alignment feature wherein the components are easily and conveniently aligned and retained without damage to the parison. Moreover, the interchangeable mandrel makes it convenient to change from one part to another. The parison is not clamped by the action of reciprocating platens and blow mold components. It is located and retained by the blow nozzle after the parison is aligned with the blow mold. In addition, the second alignment means finally aligns the parison with the mandrel and blow mold to prevent misalignment of the parison upon final blowing. Moreover, forces resulting from alignment and clamping are not transmitted to the blow mold.

Further advantages and features of the present invention will appear hereinbelow.

BRIEF DESCRIPTION OF THE DRAWINGS

The present invention will be more readily understandable from a consideration of the accompanying drawings, wherein.

DETAILED DESCRIPTION OF THE PREFERRED EMBODIMENTS

Figure 1:
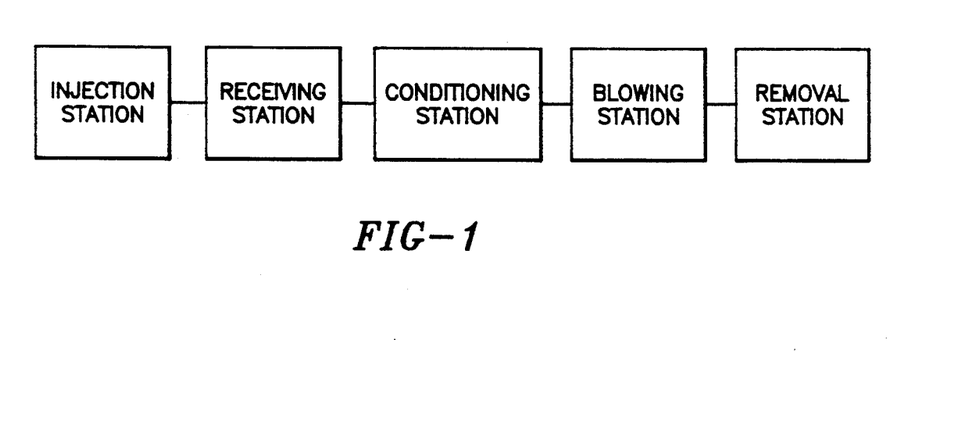
FIG. 1 is a block diagram showing the stations through which the parisons pass.

Referring to the drawings, FIG. 1 shows in a block diagram the preferred cycle from injection station where the parisons or preforms are prepared, to receiving station where they are transferred to holding means including mandrels, preferably by a robot, to a temperature conditioning station where the temperature is adjusted so as to be suitable for blowing and biaxial orientation, to the blowing station, and finally to the blown article removal station. The cycle is shown in U.S. Pat. No. 4,690,633. The particular features of the overall cycle are not critical to the present invention. Thus, one can readily use an apparatus as shown and described in U.S. Pat. No. 4,690,633. The parisons may or may not be prepared in-line with the other operations and may readily be made at a different time. The transfer path may take the form of an oval path, a straight path, or a horse-shoe shaped path, or any convenient configuration.

The apparatus of the present invention is directed to the alignment and clamping of the blow mold portions to minimize adverse effects of the alignment and clamping and to minimize adverse effects of the blowing force from the high pressure fluid.

Figure 2:
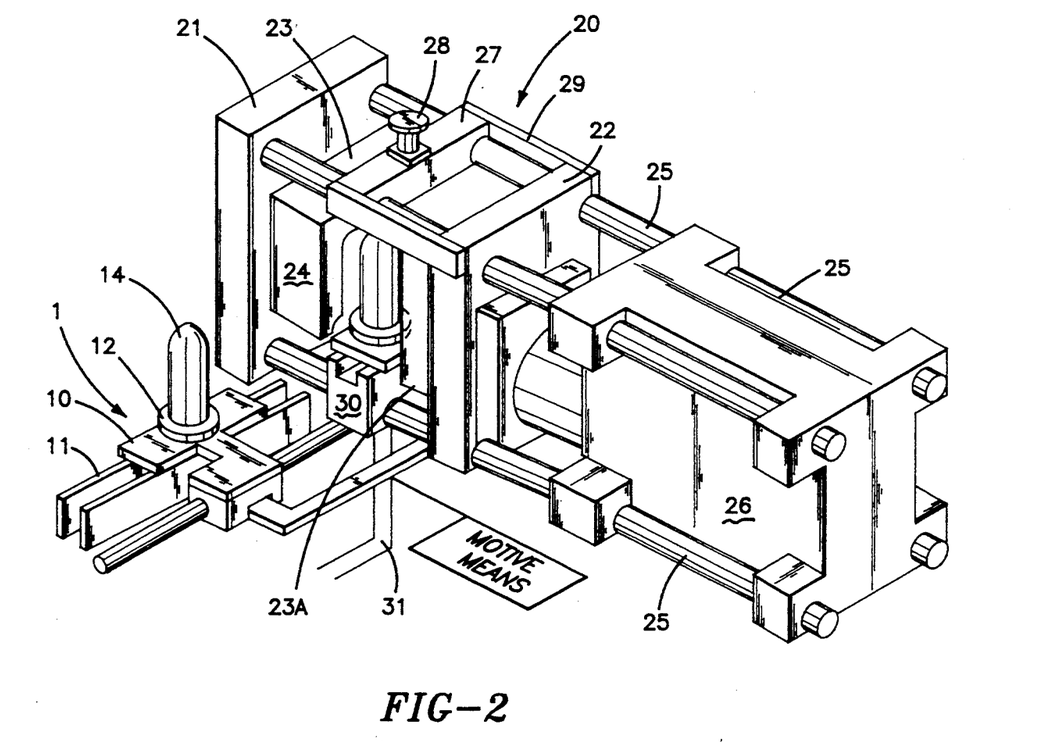
FIG. 2 is an isometric view of the blow molding station.

FIG. 2 is an isometric schematic view of a representative blow molding station including the holding means with parison thereon aligned and ready to be received by the blow mold. FIG. 2 shows a single holding means carrying a single parison; however, it should be understood that the present invention may readily be used when the holding means carries a plurality of parisons or when a plurality of mandrels carry a plurality of parisons. For convenience, in the following discussion, the present invention has been described with a single holding means carrying a single parison.

Referring to FIG. 2, holding means 1 includes pallets 10 retained in channel track 11 having been transferred thereto from the conditioning station by means not shown. Pallets 10 hold rotatable mandrels 12 which in turn hold parisons or preforms 14. The particular parison shape is representative only and any suitable shape can be used. The parison and mandrel arrives at the blow station after traversing a conditioning station on a rotating mandrel as described in the aforesaid U.S. Pat. No. 4,690,633.

Blow mold 20 includes fixed first platen 21 and movable second platen 22, fixed first mold portion 23 and movable second mold portion 23A forming therebetween a mold cavity 24 in the shape of the hollow article to be formed. Movable platen 22 moves on tie rods 25 activated by motor 26. Base mold 27, if used, is positioned above mold 24 to form the article bottom with piston 28 connected thereto for moving the bottom mold into appropriate alignment for formation of the desired base for the article and motive means (not shown) connected thereto for activating said piston. It may be preferred to have both platens and mold portions movable. The present invention also contemplates one platen being fixed as shown in FIG. 2. Linkage means 29 are provided connected to the movable platen 22 and bottom mold 27 in order to maintain the desired positioning thereof. For clarity only, the top linkage means are shown in FIG. 2. Channel track 30 sits spaced from but closely adjacent to channel track 11 so that pallets 10 can readily move into position in the blow mold. The holding means may include a depending leg or spindle or other means which may be engaged by a chain link or any other desired motive means for moving the pallet. Means 31, which generally includes a blow nozzle, are also provided for introducing high pressure fluid from a fluid source (not shown) into the parison in the mold cavity to expand the parison into conformity with the mold cavity. If desired, a stretch rod may also be provided for introduction into the parison as is known in the art to provide a stretch blow molded article.

Figure 3:
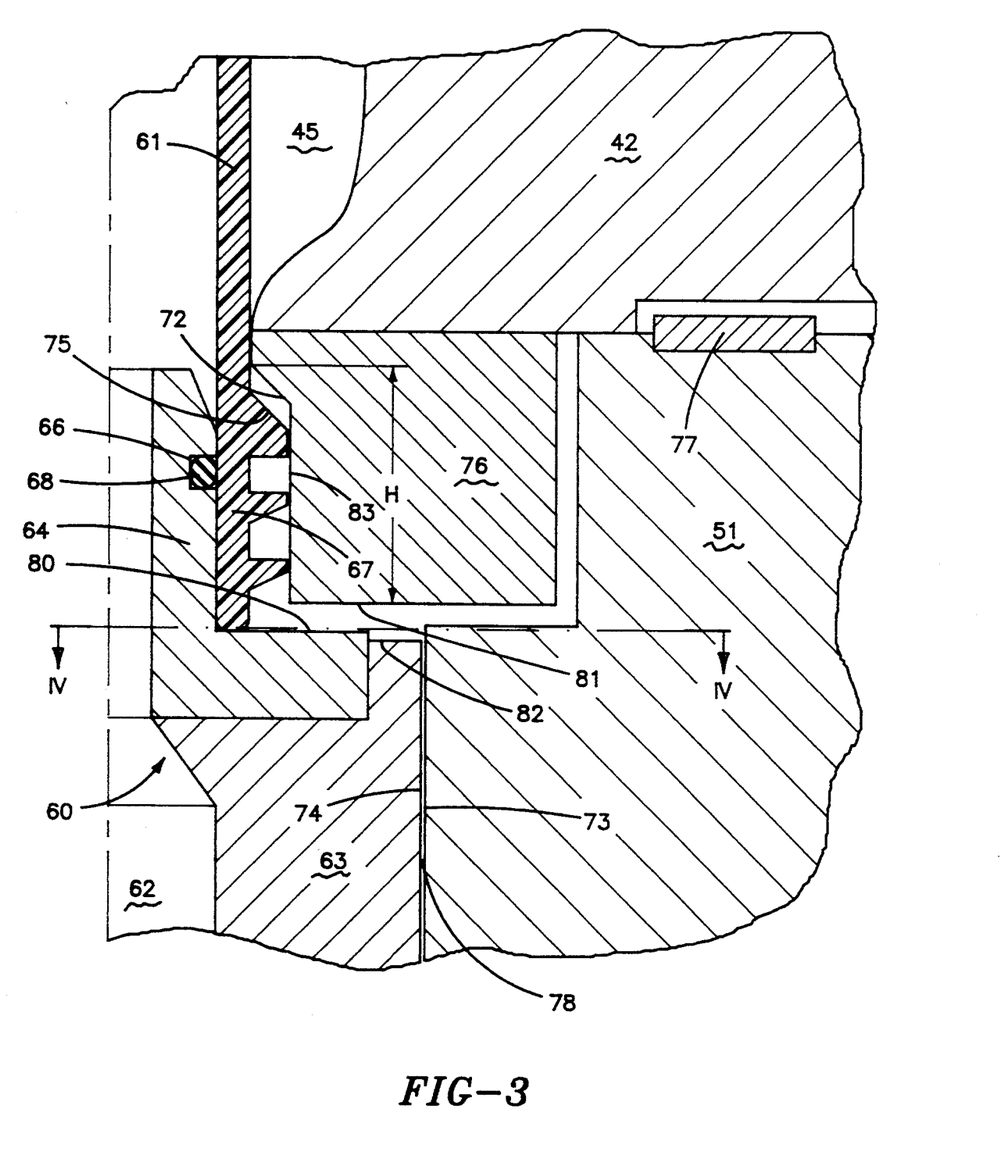
FIG. 3 is a detailed view of the holding means and blow mold in the mold closed condition.

FIG. 3 shows blow mold half 42 in the mold closed position. Naturally, there will be a second blow mold half as shown in FIG. 2 generally having the same configuration as half 42 (see blow mold halves 41 and 42 in FIG. 5), and the blow mold halves are affixed to platens 43 and 44 (shown in FIG. 4), as for example by bolting. The mold halves form a mold cavity 45 therebetween having a shape of a desired article. The platens and mold portions affixed thereto are relatively reciprocable from the mold open to closed to open positions via motive means (not shown). As indicated hereinabove, both platens and mold portions may be movable or if desired one of the mold portions may be fixed. If desired, a small controlled gap can be provided between the blow mold halves in the mold closed position for venting.

Figure 4:
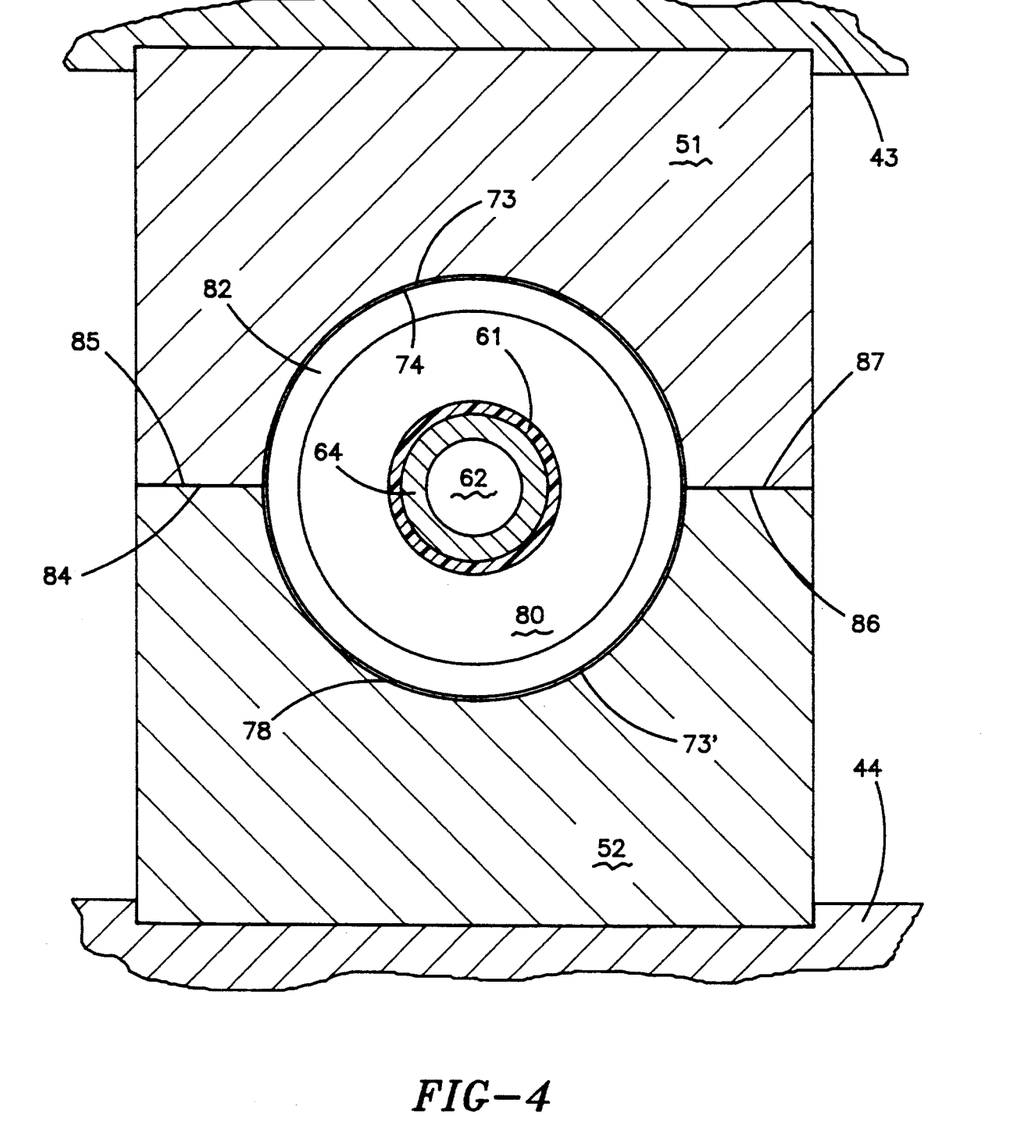
FIG. 4 is a view along line IV—IV of FIG. 3.

Holding means 60 are provided for holding parison 61 within blow mold 45 including channel means 62 communicating with the parison on the one hand and with a source of fluid pressure (not shown) on the other hand permitting the introduction of high pressure fluid into parison 61 to expand same into conformity with the blow mold in the mold closed position as shown in FIGS. 3–4. Holding means 60 with parison 61 thereon is normally moved into position between the blow mold halves and the blow mold halves 41 and 42 closed therearound.

Holding means 60 includes a spindle portion 63 and a mandrel 64. The mandrel is an interchangeable piece affixed to the spindle by any desired means which is specific to the neck finish of the particular parison. The mandrel has a top face 80 which may extend beyond the end face 82 of spindle 63. Mandrel 64 is provided with groove 66 on the outside surface thereof facing parison neck 67 that carries a sealing element, as 0-ring 68. This sealing element is located essentially opposite outwardly extending parison flange 75. The open end of parison 61 sits on surface 80 insuring a positive axial location of parison 61 on mandrel 64. This locates flange 75 relative to mandrel surface 80.

The O-ring 68 is initially compressed by parison 61 on mandrel 64 which aids in retaining parison 61 on the mandrel during transport, alignment and clamping in the blow station.

The first alignment means includes first and second locking plates 51, 52 (see FIG. 4). Each locking plate is affixed to a corresponding platen, as plate 51 is affixed to platen 43 and plate 52 is affixed to platen 44 as clearly shown in FIG. 4, and each plate is keyed to a corresponding mold half, as plate 51 is keyed to mold half 42 by keying means 77 as shown in FIG. 3. Thus, the first alignment means are in fixed relationship to the blow mold halves and are spaced from the mandrel. When the mold halves close, faces 85 and 87 of first locking plate 51 contact faces 84 and 86 of second locking plate 52 to close the blow mold halves and hold them in the mold closed position.

Spindle 63 includes an annular peripheral spindle surface 74 which faces peripheral surface 73 on first plate 51 and peripheral surface 73' on second plate 52, with a small space 78 formed therebetween in the mold closed position. Space 78 is generally of the order of 0.0004–0.003 inch. Thus, in operation, the pallet with spindle 63, mandrel 64 and parison 61 enter the blow molding station and the platens move towards the spindle. Faces 85 and 87 of first locking plate 51 contact faces 84 and 86 of second locking plate 52 as shown in FIG. 4 and the blow mold is firmly locked in the mold closed position. In addition, peripheral surfaces 73 and 73' of first and second plates 51 and 52 surround peripheral spindle surface 74 forming a small gap or space 78 therebetween sufficient to allow movement of spindle 63 within space 78. The gap 78 is too small to allow axial misalignment between spindle 63 and plates 51 and 52. In addition, the holding means 60 with parison 61 thereon is aligned with the blow mold by the action of the first alignment means.

Each blow mold half has its own second or final alignment means, as retaining means 76 on blow mold half 42 which forms a bore 83 in the mold closed position, i.e., after the blow mold has been locked and the holding means aligned with the blow mold by the action of the first alignment means. The retaining means or retaining insert of the second alignment means (which may be integral with a blow mold half or a separate piece attached thereto) is polished when assembled with the blow mold halves so that a smooth finished article is produced with no visible seam in the final article. Retaining means 76 has an end face 81 as a clamping surface that is a controlled distance H from retaining flange 72.

The motion of the platens and locking and alignment of the components as described above by the first alignment means does not result in any contact between parison 61 and any of the reciprocating components. When the mold is in the mold closed position shown in FIG. 3, bore 83 is larger than parison flange 75. This clearance insures that no damage is caused by a slightly misaligned parison. Also, parison flange 75 is located below retaining flange 72 in this mold closed position. This spacing between the parison and second alignment means remains until the parison is blown.

Figure 5:
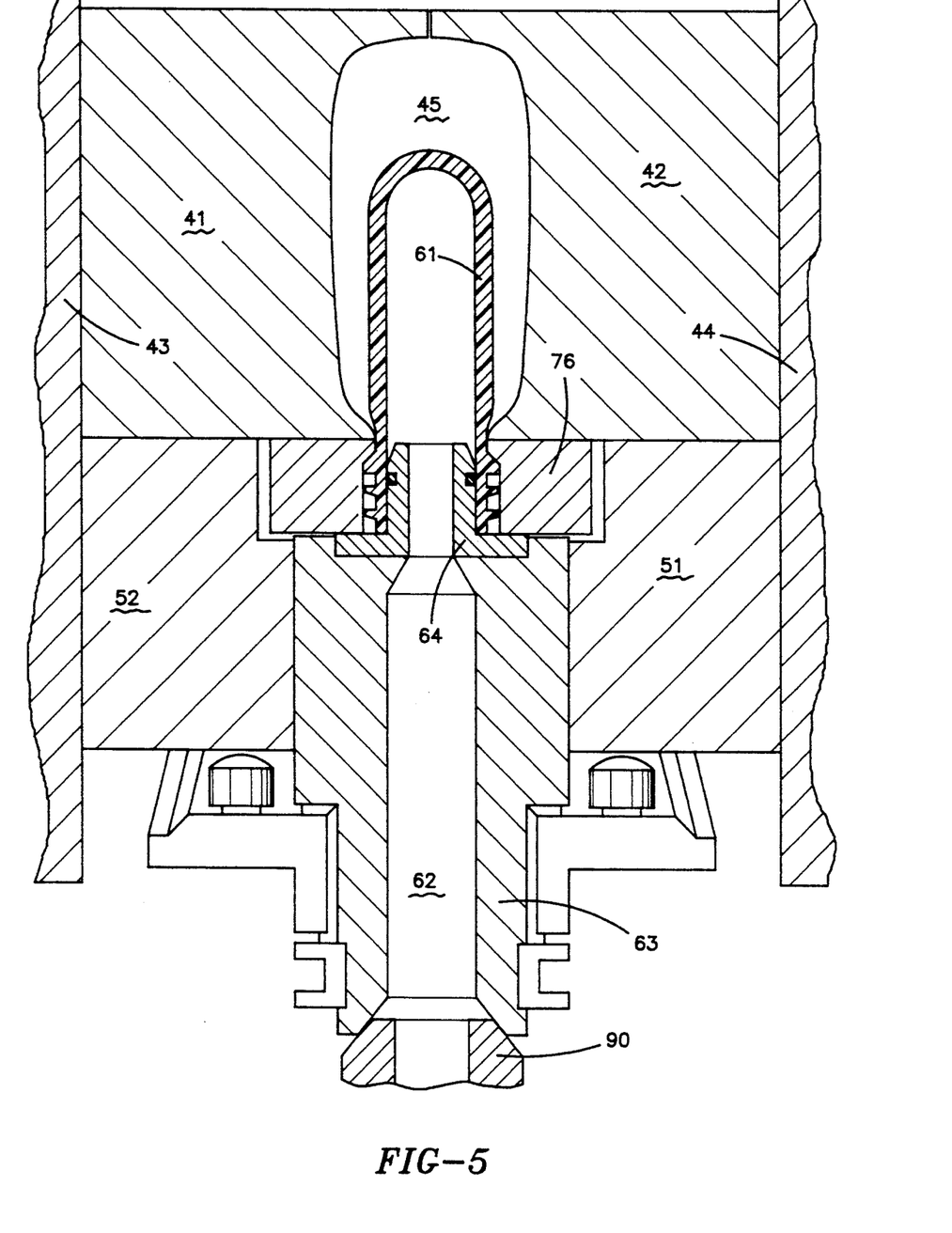
FIG. 5 is an enlarged view similar to FIG. 3 showing the blow mold in the mold closed position including the blow nozzle engaging the holding means.

Once the mold is closed, blow nozzle 90 moves axially to engage spindle 63 as shown in FIG. 5 on the opposite end of where interchangeable mandrel 64 is located. The nozzle forces the spindle to move upward through space 78 into the position shown in FIG. 5 and shown in more detail in FIG. 6. This causes clamping surface 81 of retaining means 76 to engage mandrel surface 80, and also causes parison flange 75 to approach retaining flange 72, for example, with up to 0.008" clearance. This approach could result in clamping action causing the parison to deform slightly in the area of contact with the retaining flange to enhance sealing of sealing element 68. The deformation is controlled by the contact of surfaces 80 and 81 and is independent of blow nozzle pressure and force. The fixed distance H ensures that retaining flange 72 is always the same distance from mandrel surface 80. Since parison flange surface 75 is also a controlled distance from the same mandrel surface 80, the location and amount of compression of the preform in the area of its flange is accurately, consistently, reliably and economically controlled. The distance between the clamping surface 81 and mandrel surface 80 is in the order of less than 0.032". Note that the area of the preform 61 is not clamped by any part of the blow mold until the parison is blown. Also, the second alignment means may compensate for any misalignment of the parison and retain the parison in position and therefore is an alignment and retaining means.

Changing from one part to another involves unbolting and replacing only two items; the blow mold cavities 41, 42 with their integral retaining inserts 76, and the mandrels 64 on the spindles 63. Since these interchangeable items are located relative to the fixed first alignment means, there is virtually no adjustment required once installed.

Figure 6:
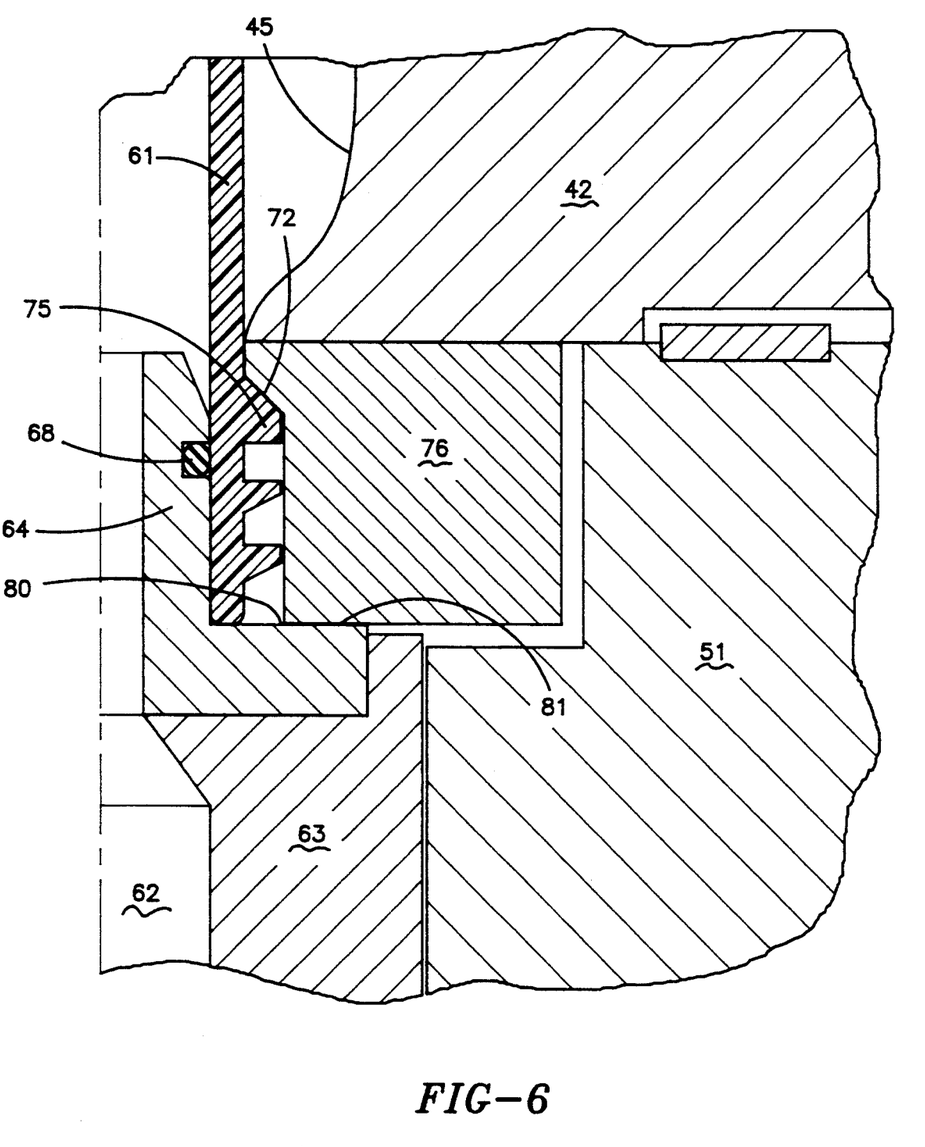
FIG. 6 is a detailed view of FIG. 5.
Figure 7:
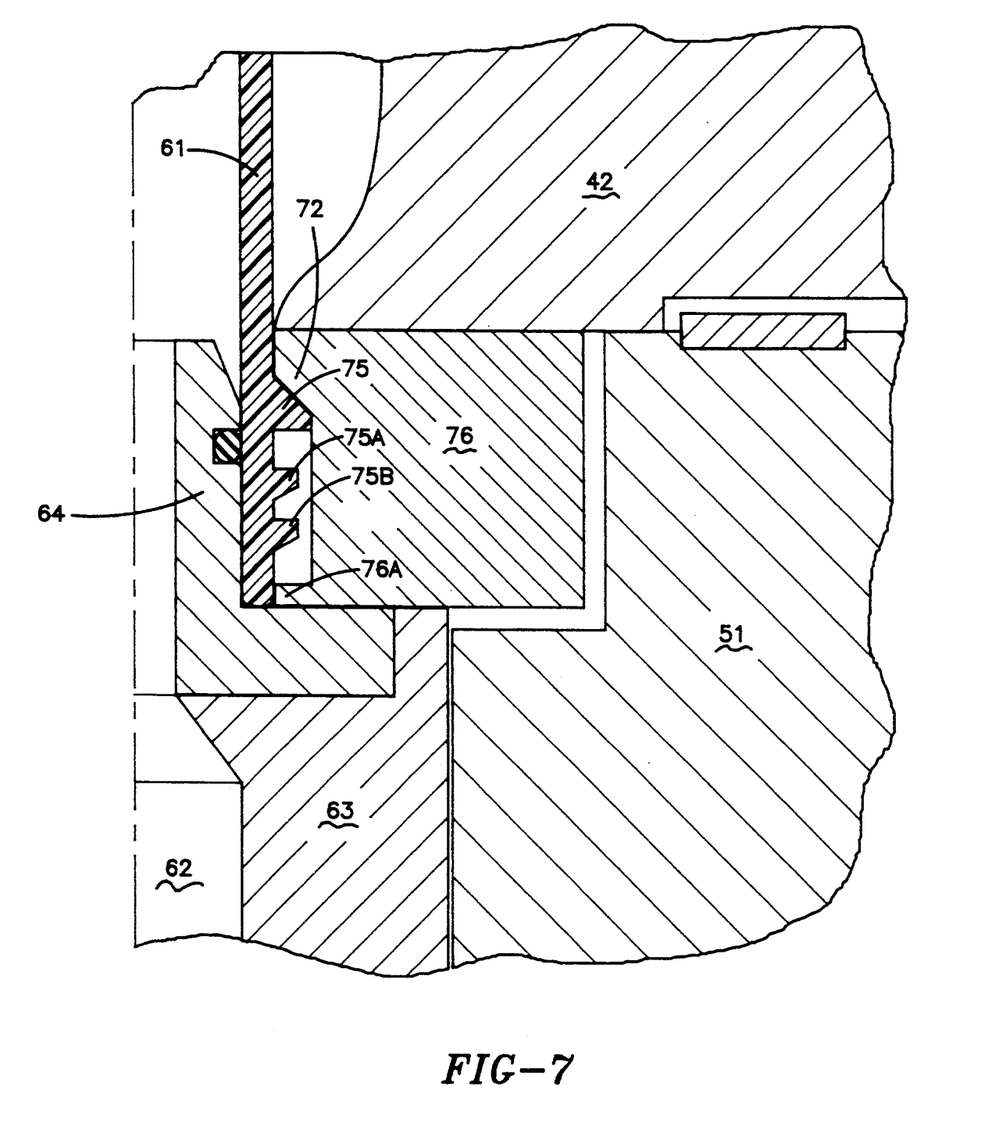
FIG. 7 is an alternate embodiment similar to FIG. 6.

The alternate embodiment shown in FIG. 7 shows the mold closed position with blow nozzle engaged similar to FIG. 6; however, parison 61 includes threads or secondary axially extending flanges 75A and 75B which extend almost as far radially towards retaining means 76 as primary flange 75. The radially extending threads aid in aligning the parison 61 with mandrel 64 and with the blow mold. Preferably, the threads do not extend as far radially towards retaining means 76 as flange 75, although they could if desired. Although two threads are shown in FIG. 7, naturally any number can be present.

Also, retaining means 76 includes an alignment flange 76A extending radially towards parison 61 adjacent the base of the parison and below the threads which locates the parison in the mold closed position and aids in aligning the parison with the mandrel and blow mold.

In addition, retaining flange 72 of retaining means 76 preferably does not contact parison flange 75 in the mold closed position. A slight gap (preferably below 0,008 inch) is left therebetween. Upon introduction of high pressure fluid into parison 61, parison flange 72 will contact retaining flange 72. The advantages of this invention including the following.

All working surfaces are located relative to fixed robust machine elements which are permanently mounted to the machine platens. The blow mold halves are located axially relative to locking plates 51 and 52 and with the platens in the direction of platen motion. The blow mold is centered on the platen face by the keys 77 also on the first alignment means.

The spindle is aligned with the blow mold by the first alignment means independently of the mold halves.

Parison is not clamped by the action of the reciprocating platens but rather possibly by the blow nozzle force after the parison is aligned with the blow mold.

Clamping deformation if any is carefully controlled with little chance of parison damage.

Forces resulting from clamping and alignment are not transmitted to the blow mold.

Quick changeover due to simple replacement of tooling components.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. Apparatus for forming hollow plastic articles which comprises: a blow mold for forming a hollow plastic article from a parison including at least two relatively reciprocable mold portions movable from an open position to a closed position; holding means for holding the parison within the blow mold including channel means within the holding means communicating with the parison permitting the introduction of high pressure fluid into the parison to expand the parison into conformance with the blow mold, said holding means also including a mandrel supporting the parison and engageable with the parison; first alignment means to align the holding means with the blow mold; second alignment means in fixed relationship to the blow mold in the mold closed position to align the parison with the mandrel and the blow mold; a blow nozzle engageable with the holding means in the mold closed position for the introduction of high pressure fluid into the parison; and wherein the second alignment means contacts the holding means and clamps the holding means to the second alignment means upon engagement of the blow nozzle with the holding means.

2. Apparatus according to claim 1 wherein the second alignment means is on the blow mold adjacent and spaced from the holding means in the mold closed position.

3. Apparatus according to claim 2 wherein the holding means includes a spindle supporting the mandrel having a peripheral spindle surface, and with the mandrel being interchangeable.

4. Apparatus according to claim 3 wherein the first alignment means includes first and second locking plates which hold the blow mold halves in the closed position, wherein each locking plate is in fixed relationship to a corresponding mold portion and is in spaced relationship to the mandrel.

5. Apparatus according to claim 4 wherein each locking plate includes a peripheral surface which faces the peripheral spindle surface in the mold closed position to provide a space therebetween to permit sliding movement of the holding means in the mold closed position.

6. Apparatus according to claim 1 wherein the second alignment means contacts the holding means and clamps the holding means and aligns the parison to the blow mold upon engagement of the blow nozzle with the holding means.

7. Apparatus according to claim 1 wherein the mandrel includes a sealing means facing the inside of the parison to seal the mandrel to the parison.

8. Apparatus according to claim 7 wherein the parison has an open end which engages a surface of the mandrel, and wherein said mandrel surface is spaced from the second alignment means in the mold closed position.

9. Apparatus according to claim 8 wherein the parison has an outwardly extending flange which engages a corresponding flange on the second alignment means upon introduction of high pressure fluid into the parison.

10. Apparatus according to claim 8 wherein the parison has an outwardly extending flange which engages a corresponding flange on the second alignment means upon engagement of the blow nozzle with the holding means.

11. Apparatus according to claim 10 wherein the second alignment means has a clamping surface which engages the mandrel surface upon engagement of the blow nozzle with the holding means, wherein the clamping surface is a fixed distance from the corresponding clamping flange on the clamping means.

12. Apparatus according to claim 1 including mold platens wherein each mold portion is carried by a corresponding mold platen.

13. Apparatus according to claim 1 wherein said second alignment means is an alignment and retaining means.

14. Apparatus according to claim 1 wherein said second alignment means includes an alignment flange extending towards the parison to aid in aligning the parison with the mandrel and blow mold.

15. Apparatus according to claim 1 wherein the first and second alignment means operate sequentially.

* * * * *